United States Patent [19]
Rietsch

[11] Patent Number: 4,889,003
[45] Date of Patent: Dec. 26, 1989

[54] MANUAL TRANSMISSION GEARSET BRAKE FOR SYNCHRONIZED ENGAGEMENT OF A SLIDING GEAR

[75] Inventor: Donald R. Rietsch, Howell, Mich.

[73] Assignee: Ford Motor Company, Dearborn, Mich.

[21] Appl. No.: 135,887

[22] Filed: Dec. 21, 1987

[51] Int. Cl.$^4$ .......................... F16H 3/38; F16D 11/04; F16D 11/10; F16D 13/22
[52] U.S. Cl. .................................... 74/339; 192/53 F; 192/67 A
[58] Field of Search ............... 74/339, 333; 192/67 A, 192/53 R, 53 F

[56] References Cited
U.S. PATENT DOCUMENTS

| | | | |
|---|---|---|---|
| 1,777,480 | 10/1930 | Schoonmaker | 74/339 |
| 4,294,338 | 10/1981 | Simmons | 74/339 X |
| 4,377,093 | 3/1983 | Janson | 74/339 X |
| 4,581,950 | 4/1986 | Schrape et al. | 74/339 X |
| 4,598,599 | 7/1986 | Ikemoto | 74/339 X |
| 4,620,623 | 11/1986 | Barksdale et al. | 192/53 E |
| 4,623,054 | 11/1986 | Barksdale et al. | 192/53 E |
| 4,674,346 | 6/1987 | Hiraiwa | 74/339 |
| 4,799,399 | 1/1989 | Bruce | 74/339 |

FOREIGN PATENT DOCUMENTS 0619878 10/1935 Fed. Rep. of Germany .... 192/53 R
1098824 2/1961 Fed. Rep. of Germany ........ 74/339

Primary Examiner—Leslie A. Braun
Assistant Examiner—Harold F. Macris
Attorney, Agent, or Firm—Frank G. McKenzie; Donald J. Harrington

[57] ABSTRACT

A manually operated automotive transmission has a cluster gear on which several forward drive input gears and the reverse drive input gear are formed integrally. An auxiliary coutershaft carries a fifth speed gear continuously engaged with a gear formed on the input shaft. A reverse idler slides on a stub shaft into engagement with a reverse pinion on the input shaft and a reverse output gear. The fifth gear synchronizer sleeve is moved away from the fifth gear when reverse gear is selected because the fifth gear selector position is in the same plane as the reverse drive position. A gearset brake is actuated by movement of the synchronizer sleeve to prevent rotation of the fifth speed gear relative to the input shaft during the initial movement of the selector shaft toward the reverse drive position. The brake mechanism is released as the selector shaft is moved fully to the reverse drive position.

7 Claims, 4 Drawing Sheets

MANUAL TRANSMISSION GEARSET BRAKE FOR SYNCHRONIZED ENGAGEMENT OF A SLIDING GEAR

BACKGROUND OF THE INVENTION

1. Field of the Invention

This invention generally relates to the field of manually operated automotive transmissions. More particularly, this invention pertains to synchronized gearshift changes in a manual transmission, especially those made in selected reverse drive.

2. Description of the Prior Art

In the operation of a manual-operated automotive transmission in which reverse drive, or any of the forward drive ratios, is engaged with the use of a sliding gear, coupler or another device for connecting a member of the selected gearset to a rotating shaft without first bringing the selected gear and shaft substantially to the same speed before they are drivably connected to each other, the driver must wait several seconds after depressing a neutral clutch to disengage an engine from the gearset before the gearshift lever can be moved to the selected position. A short interval is required to afford adequate time to dissipate, through friction and windage losses, the rotating inertia of the gearset after it is drivably disconnected from the power source If the gear selector lever is moved to the selected position before the speed of the gear and the shaft are substantially equal or before sufficient rotating energy is dissipated, the teeth of the coupler or synchronizer sleeve will strike the clutch teeth of the member to be engaged The force applied manually by the vehicle operator to the coupler or synchronizer sleeve toward the direction of their engagement with the selected gear will cause a loud clash as the tips of the sleeve teeth and those of the dog or clutch teeth are forced together but are unable to mesh because of their relative rotational speeds. The clash is objectionable to most drivers and can, if the forces applied by the operator are large enough, damage the clutch teeth or those of the sleeve.

An obvious technique to avoid this difficulty is to provide fully synchronized gear engagement. This approach has been adopted throughout the automotive industry with respect to all of the forward drive ratios including the lowest speed ratio. However, the cost and complexity to synchronize the reverse drive engagement has not been fully justified commercially, particularly in view of the limited need for reverse synchronized engagement. Generally, it can be assumed that reverse drive is selected when the vehicle is operating at low speed or when the drive wheels are fully stopped through operation of the wheel brakes. Furthermore, the delay between the time when the neutral clutch pedal is depressed to disengage the engine from the gearset and the time when the selector lever can be moved to the reverse drive position without producing clash is acceptable, though longer than the period required for this action between gear shifts in the forward drive ratios while the vehicle is accelerating or traveling at high speed.

Nonetheless, any delay after the neutral clutch pedal is depressed and before the shift lever can be moved to the reverse drive position to avoid causing clash is objectionable, particularly so in a small vehicle where high speed engines and manual transmissions are often used. Even at the idle speed of small modern engines, the gearset when driven by the engine turns at a high speed, has inherently high inertia and requires longer periods of delay before the reverse drive or any unsynchronized gear shift can be completed.

SUMMARY OF THE INVENTION

The device according to this invention is employed in a transmission having at least one drive ratio produced with a sliding gear coupler, or other unsynchronized technique, and wherein that drive ratio is located in a common gearshift plane with another drive ratio whose engagement is made synchronously. The sleeve of the synchronizer that drivably engages the gear ratio located in the same plane as the unsynchronized gear ratio is moved axially along the shaft on which it is supported toward the corresponding gear wheel to make the synchronized engagement, and away from that gear wheel when the selector shaft is moved in the direction that produces the synchronized gearing engagement. Therefore, there is a neutral position between the extremities of the gear selector movement where neither of the gear ratios is engaged and where the operator depresses the neutral clutch prior to engaging either of the gear ratios located in the shift plane.

The synchronizer of this invention includes a braking mechanism for stopping rotation of a gear wheel that is not a member of the selected gearset and whose engagement when a member of a selected gearset is made synchronously by movement of the synchronizer sleeve from the neutral position toward the gear ratio wheel. The gear wheel is continually engaged with an input cluster shaft that is drivably connected to the engine through a neutral clutch, whose engaged and disengaged state is determined by manual operation by the vehicle operator of a clutch pedal. In this way, after the neutral clutch is depressed, the input shaft inertia is dissipated by brake friction through operation of the synchronizer brake until the gear wheel is stopped. The cluster gear includes multiple input pinions each of which are continually engaged with output gears carried on a countershaft. The output gears are drivably connected to the countershaft through conventional synchronizer clutches whose sleeves are moved to produce a connection between the countershaft and the selected gear as the vehicle operator manually moves the selector lever between the various gear ratio positions. The output gears are rotatably supported on their countershaft, but the gears are merely journalled on the countershaft and connected drivably to it through operation of the associated synchronizer clutches.

The gearset brake according to this invention includes a tang formed on the inside surface of the synchronizer clutch sleeve, a first plunger mounted within a radially directed bore formed in the hub of the synchronizer, and a second plunger adapted to contact the first plunger and to move axially against the force of a compression spring located between the second plunger and the blocker ring in accordance with axial displacement of the synchronizer sleeve. A blocker ring is rotatably supported on a conical brake surface formed on the gear wheel adjacent the synchronizer clutch. Axial movement of the blocker ring against the conical brake surface results due to movement of the sleeve toward the selected gear wheel while making the synchronized engagement or as a result of movement of the second plunger. The sleeve moves in the opposite axial direction to produce the nonsynchronized gear engagement and causes the rotational speed of the gear wheel journalled on the auxiliary countershaft to be brought toward the speed of the synchronizer hub, sleeve and auxiliary countershaft.

To produce synchronized engagement of the gear wheel, spline teeth formed on the inner surface of the synchronizer sleeve mesh with the teeth on the blocker ring after the speeds are synchronous. Further movement of the synchronizer sleeve toward the gear wheel positively engages dog teeth formed on the gear wheel to produce a drivable connection between the gear and the countershaft. However, when the synchronizer brake is used to facilitate engagement of the sliding gear, the blocker ring produces the identical function as in the synchronized engagement, but the selector sleeve is moved away from the gear wheel. The speed of the synchronizer hub corresponds to the rotational speed of the drive wheels of the vehicle when the sliding gear drive ratio is selected because of a direct geared connection between the synchronizer hub and drive wheels of the vehicle. If the vehicle is stopped before the sliding gear drive ratio is selected, the first portion of the movement of the selector lever from the neutral position toward the nonsynchronized gear ratio position moves the sleeve, causes the blocker ring to bear against the gear wheel, and stops the gear wheel, or makes its speed correspond to the speed of the selector hub if the vehicle is moving. The gear wheel is drivably connected to, and engaged continually with, the input shaft which is drivably disconnected through operation of the neutral clutch.

Subsequent movement of the selector lever causes the reverse idler to slide along the axis of the stub shaft on which it is supported and permits the gear teeth of the reverse idler to engage the teeth of the reverse pinion formed on the input cluster shaft and with the reverse output gear without any relative rotating between the reverse idler, reverse pinion, or reverse output gear. A compression spring located between the second plunger and the blocker ring biases the synchronizer brake to a position where the brake is released and permits unobstructed operation of the gearset.

The reverse spin down brake of this invention comprises simple components and includes minor machining variations in a conventional synchronizer hub located at three angularly-spaced positions about the axis of the hub. The parts are readily assembled and the synchronizer sleeve is formed with the tangs at three locations that align angularly with the location of the braking components.

DESCRIPTION OF THE PREFERRED EMBODIMENT

Figure 1:
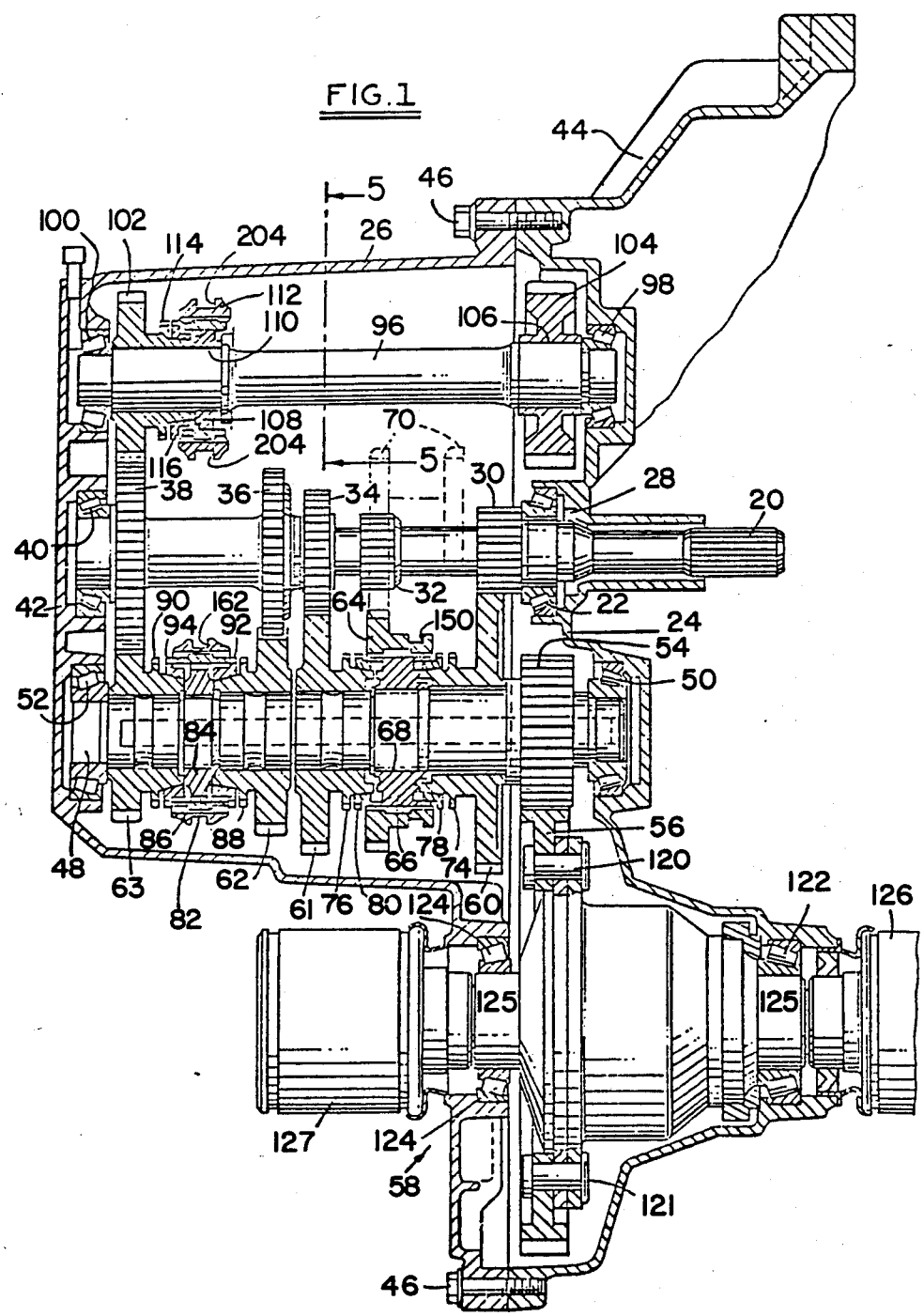
FIG. 1 is a cross section through a multiple countershaft manual transmission and a differential mechanism to which the gearset brake of this invention is applied.

Referring first to FIG. 1, an input shaft assembly 20 is journalled in a bearing 22 mounted in the support wall 24 of the transmission housing 26. The shaft seal 28, located in an annular recess formed in the support wall 24, seals the outer periphery of shaft 20.

Formed on or carried by shaft 20 are five torque input gears shown respectively at 30, 32, 34, 36 and 38. These gears form torque delivery paths during operation in low speed ratio, reverse, second speed ratio, third speed ratio and fourth speed ratio, respectively. Drive gear 38 further operates to provide a portion of the torque delivery path for the fifth speed ratio The left end of the input shaft is journalled by bearing 40 in a bearing opening formed in the end wall 42 of the housing 26. The right-hand end of the housing is bolted to the left-hand end of the clutch housing 44 as indicated by the attachment bolt 46.

A countershaft 48 is journalled at one axial end in bearing 50, which is received in a recess formed in wall 24, and at the opposite end in bearing 52, which is received in a recess formed in the end wall 42. Output gear 54 is fixed to or integrally formed with countershaft 48 and meshes with the output gear 56, which drives a differential gear assembly designated generally by the reference character 58. The countershaft supports pinions 60-63, each forming a part of the torque delivery paths for low speed ratio, second speed ratio, third speed ratio and fourth speed ratio The pinions are journalled on the outer surface of the countershaft A reverse gear 64 is formed integrally with the sleeve of synchronizer clutch 66, which is splined at 68 to the countershaft 48. A reverse drive idler 70, which moves between the extremities of its range shown in FIG. 1, meshes with the teeth of the reverse input gear 32 and the reverse pinion 64 when it is moved into alignment with those gears Reverse gear 64 has internal clutch teeth adapted to engage dog teeth 74, 76 formed respectively on the hubs of output gear wheels 60 and 61. Synchronizer rings 78, 80 act to synchronize the speed of the reverse gear 64 with the speed of pinions 60 or 61 before engaging the associated dog teeth of the pinion. In this way the pinions are drivably connected through the synchronizer hub to countershaft 48.

When the reverse idler is aligned with gear 32 and reverse pinion 64, a reverse torque delivery path is completed between the input shaft 20 and the output gear 54. When operating the transmission in any ratio except reverse ratio, reverse idler 70 is located at the right-hand end of its range of motion.

A three-four synchronizer clutch 82 is splined at 84 to countershaft 48 and carries external splines on which an internally splined clutch sleeve 86 is slidably mounted. Sleeve 86 has internal clutch teeth adapted to engage dog teeth 88, 90 formed respectively on the hubs of pinions 62 and 63. The synchronizer clutch rings 92, 94, located between hub 82 and pinions 62, 63, establish speed synchronism between the countershaft and the selected gear in accordance with the direction that clutch sleeve 86 is moved.

An auxiliary countershaft 96 is rotatably supported by bearings 98 and 100 on the walls of the clutch housing and transmission casing, respectively The fifth speed ratio pinion 102 is journalled on the outer surface of countershaft 96 and is in continuous meshing engagement with input gear 38 as is fourth speed pinion 63. A fifth speed output gear 104 is splined at 106 to countershaft 96 and is in continuous meshing engagement with output gear 56. Located between pinion 102 and gear 104, a third synchronizer clutch hub 108 is splined at 110 to the countershaft. The hub has external splines 111 on which an internally splined clutch sleeve 112 is mounted. The sleeve is formed with internal clutch teeth 113 adapted to engage external dog teeth 114 on the hub of the fifth speed pinion 102. A synchronizer blocker ring 116, located between the dog teeth and the clutch hub, establishes synchronism between countershaft 96 and pinion 102.

The differential gear assembly 58 includes output gear 56, which is riveted to flange formed on the differential assembly at 120, 121. The differential is journalled at one end by the bearing 122, which is received in an annular recess formed in the end wall 24, and at the opposite axial end by the bearing 124, which is received in an annular recess formed in the transmission housing 26. Bevel gears mounted on the driveshafts transmit engine torque to each of two constant velocity universal joints 126, 127, through which power is transmitted to each of the forward wheels of the vehicle.

Referring now to FIGS. 2 and 3A-3C, synchronizer sleeve 112 slides leftward on hub 108 when the vehicle operator moves the selector shaft from the neutral position within the 5-R shift plane to the fifth gear position. The fifth gear wheel 102 is formed with an external conical surface 130 on which the internal conical surface of blocker ring 116 is supported. As sleeve 112 is moved leftward, the end faces of internal spline teeth 113 abut the end faces of the teeth 132 formed on the periphery of the blocker ring, thereby forcing the blocker ring against conical surface 130. When the rotational speeds of the blocker ring and of the sleeve are synchronous, the internal spline teeth on the sleeve fit between the teeth on the blocker ring, thereby creating a drivable connection between the blocker ring and the sleeve. Thereafter, the sleeve passes through the blocker ring teeth into contact with the dog teeth 114 on the fifth gear wheel. The sleeve also engages these dog teeth, thereby drivably connecting the fifth gear wheel to countershaft 96 through the spline connection between the sleeve and hub 108 and the spline 110 by which the hub is connected to shaft 96.

Spaced angularly about the axis 134 of the auxiliary countershaft at intervals of approximately 120° is a portion 136 of the fifth gear synchronizer, which is activated during the initial movement of the shift lever to the reverse drive position, is used next to brake the gear train rotation momentarily, then to release the braking action and finally to allow completion of the shift to the reverse drive position. This device stops rotation of the transmission gearset before the teeth of reverse idler 70 come into contact with the teeth of reverse pinion 32 and the reverse output gear formed on the outer surface of synchronizer sleeve 64.

Figure 2:
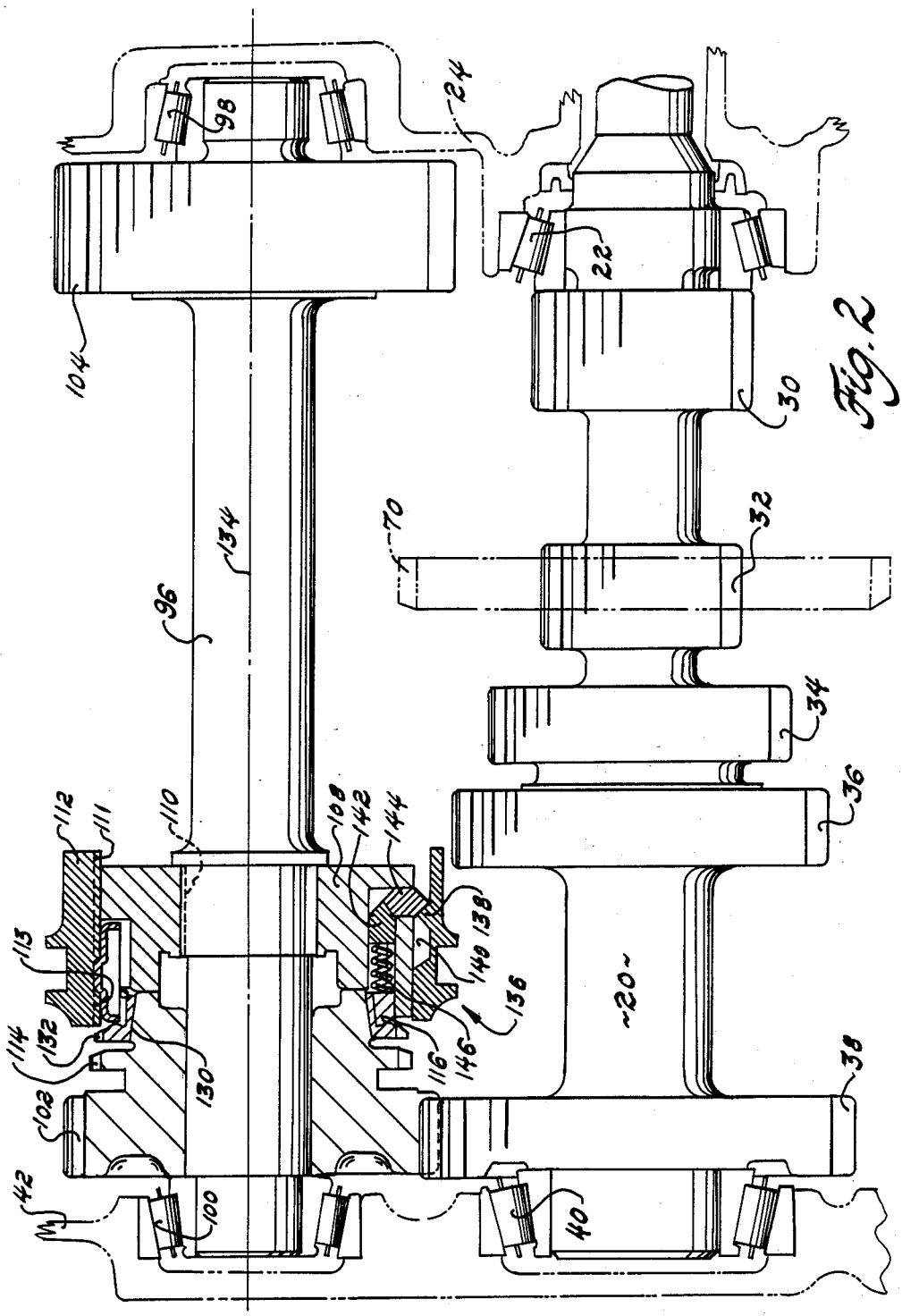
FIG. 2 is a cross section through the input shaft and auxiliary countershaft showing the fifth gear and its synchronize.
Figure 3A:
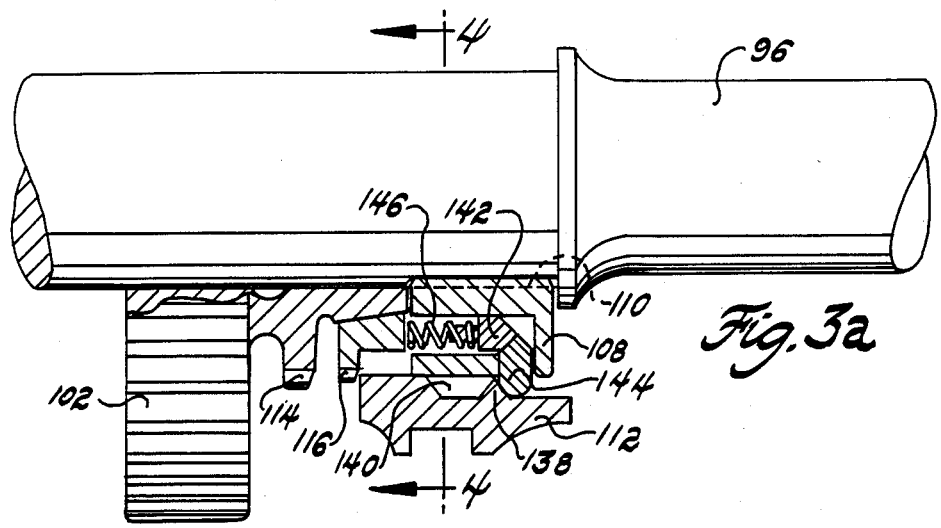
FIGS. 3A, 3B and 3C are cross sections showing a portion of the fifth speed synchronizer and brake mechanism in their various operating positions.
Figure 3B:
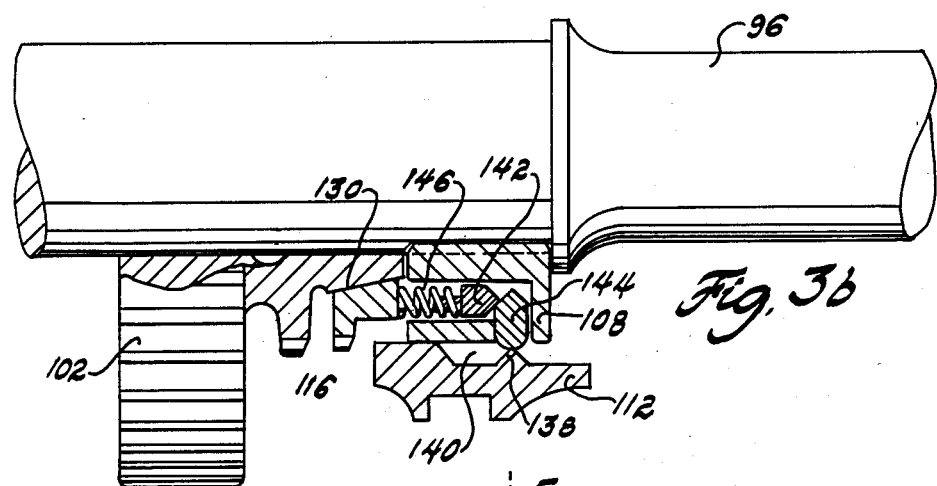

The synchronizer sleeve is shown in FIGS. 2 and 3A in the neutral position. The inner surface of the synchronizer sleeve is formed with a tang 138 having conical surfaces on each axial face, and a recess 140 adjacent the tang. A first plunger 142 is biased rightward by a coiled spring 146 fitted between blocker ring 116 and the first plunger. A second plunger 144 has conical surfaces at each of its ends, the first of these is located to engage the tang 138 on sleeve 112 and the second is adapted to engage the conical surface at the end of the first plunger. Alternatively, plunger 144 can be formed with a spherical radius adapted to contact tang 138.

Figure 6:
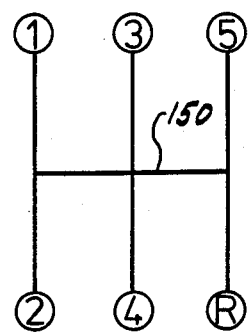
FIG. 6 is a diagram showing the various shift planes through which the gear selector lever is moved by the vehicle operator, including the plane that contains the fifth forward drive position and the reverse drive position.
Figure 5:
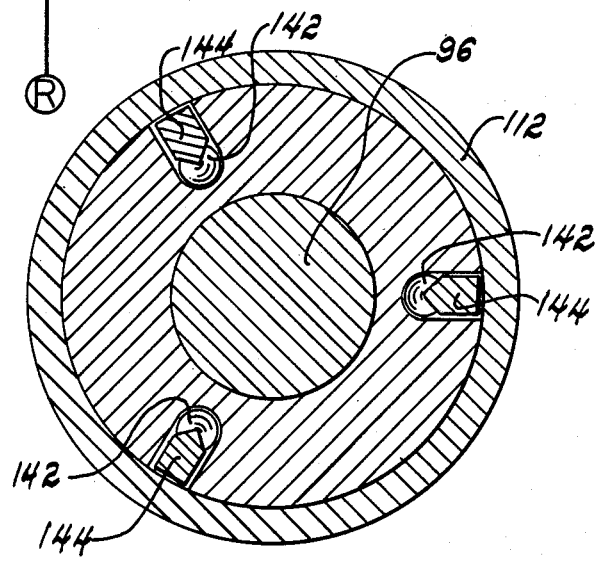
FIG. 5 is a cross section taken at plane 5—5 of FIG. 3C.

FIG. 3A shows that when the gearshift lever is in the neutral position, tang 138 contacts the end of the second plunger, and spring 146 biases the first plunger axially into contact with the second plunger, which moves radially outward into contact with tang 138. As the gearshift lever is moved from the neutral plane 150 of FIG. 6 to the reverse drive position R, plunger 144 moves radially inward, as in FIG. 3B, due to contact with the tang, which action forces plunger 142 leftward against the force of the spring. A force is applied to blocker ring 116 by the spring and is reacted by contact between the blocker ring and the internal conical surface 130 formed on gear wheel 102. The force developed between blocker ring 116 and the fifth speed gear operates to stop the rotation, not only of gear 102 but also of the input shaft 20, because of the continual engagement of gears 38 and 102. The neutral clutch on the transmission will have disengaged the input shaft from the engine before the shift lever is moved from the neutral plane to the reverse drive position.

When the drive wheels of the vehicle are stopped, synchronizer sleeve 64 is held against rotation and is axially aligned with pinion 32 in the neutral position. In this position, both the reverse output gear formed on the periphery of synchronizer sleeve 64 and the reverse pinion 32 are stopped through operation of the braking device and its connection through gears 104, 54 and the differential mechanism 58 to the drive wheels of the vehicle. Pinion 32 and the reverse output gear are therefore ready to be engaged by the reverse idler 70 which is supported on the stub shaft for axial sliding motion and rotation. The actuation of the reverse idler and the shaft mechanism is described in U.S. Pat. No. 4,799,399, filed Sept. 8, 1981, the entire disclosure which is herein incorporated by reference.

Figure 3C:
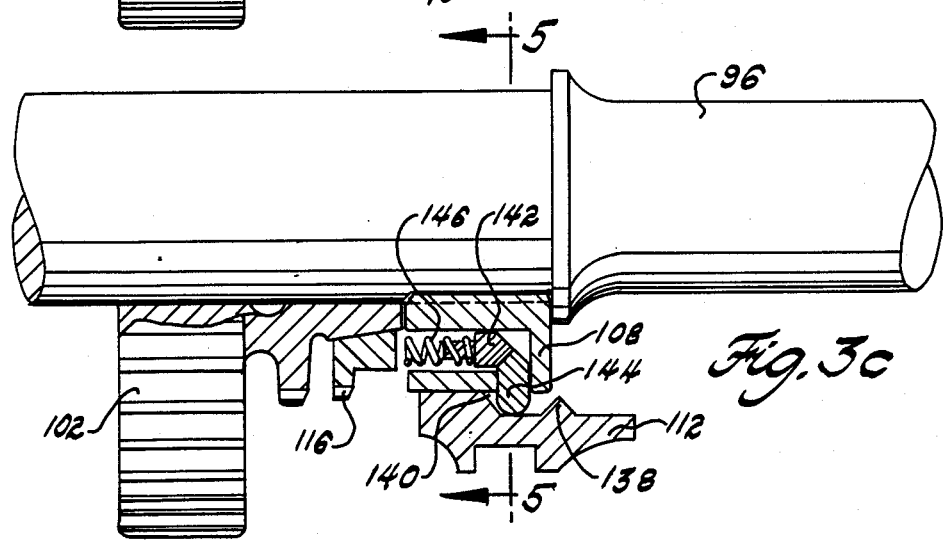
Figure 4:
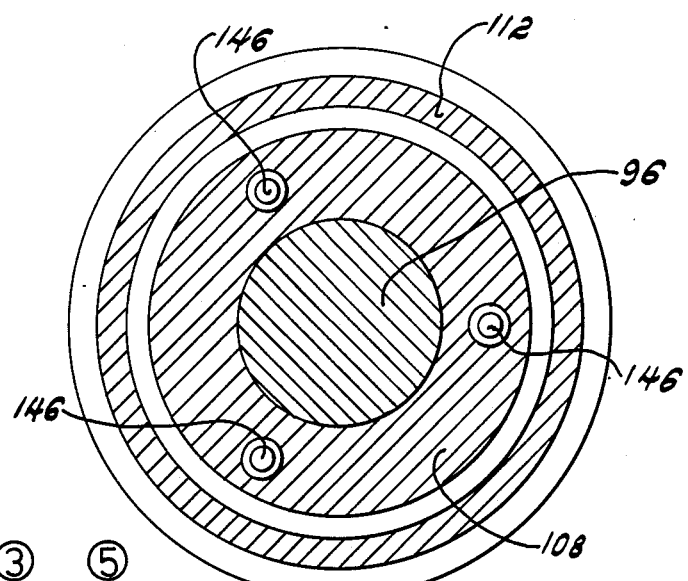
FIG. 4 is a cross section taken at plane 4—4 of FIG. 3A.

FIG. 3C shows the braking device at a later time during the gearshaft after the selector shaft has been moved fully to the reverse drive position. When this occurs, the synchronizer sleeve moves yet further rightward so that tang 138 clears plunger 144 and allows the plunger to move radially outward into the recess 140. This action removes the force that formerly biased blocker ring 116 against the reverse gear, disengages the gearset brake and permits input shaft 20, fifth speed gear 102 and the other components of the driveline to rotate freely without obstruction.

The process is reversed when the gearshift lever is moved from the reverse drive position R to the neutral position after the neutral clutch is disengaged. In this instance, plunger 144 is moved radially inward to contact tang 130 and plunger 142 causes spring 146 to press against blocker ring 116. The gearset brake is reapplied while the neutral clutch disengages the engine from the input shaft After the gearset is stopped, reverse idler 7 is disengaged from reverse pinion 32 and reverse output gear on synchronizer 64, the synchronizer sleeve is moved leftward to the position shown in FIG. 3A and the gearset brake is once again disengaged Having described a preferred embodiment of my invention, what I claim and desire to secure by U.S. Letters Patent is:

1. A device for synchronizing and connecting components of a transmission, comprising:

a gear rotatably supported on a shaft;

shift control means moveable along the axis of the shaft from a neutral position in a first direction and in a second direction opposite the first direction;

first means supported on the shaft, moveable toward the gear for synchronizing the rotational speeds of the gear and shaft and for drivably connecting the gear and shaft in response to movement of said shift control means in said first direction; and second means for converting movement of said shift control means in the second direction to movement of the first means toward the gear and for synchronizing the rotational speeds of the gear and shaft, no driving connection being established between the gear and shaft when movement of said shift control means in the second direction is completed.

2. The device of claim 1 wherein:

the shift control means includes a sleeve drivably connected to the shaft and having clutch teeth thereon;

the gear includes a brake surface and clutch means engageable by the clutch teeth of the control means for drivably connecting the gear to the first shaft;

the first means includes a blocker ring supported on the brake surface and moveable against the brake surface to synchronize the rotational speeds of the blocker ring and gear; and the second means includes means responsive to movement of the sleeve for forcing the blocker ring against the brake surface as the sleeve is moved in the second direction.

3. The device of claim 2 wherein the second means comprises means for converting movement of said shift control means in the second direction to movement of the blocker ring in the first direction.

4. The device of claim 2 wherein the shift control means is drivably connected to the shaft and includes actuating means thereon, and the second means includes:

a hub fixed to the first shaft having a passage and a second passage intersecting the first passage;

a first plunger means located in the first passage contacting the actuating means for moving the first plunger along the first Passage in response to movement of the shift control means;

a second plunger located in the second passage contacting the first plunger for movement along the second passage in response to movement of the shift control means; and means biasing the first and second plungers into contact and biasing the first plunger and actuating means into contact.

5. The device of claim 2 wherein the shift control means is drivably connected to the shaft and includes a sleeve having actuating means thereon, and the second means includes:

a hub fixed to the first shaft having a passage directed radially from the first shaft, and a second passage directed substantially parallel to the first shaft intersecting the first passage;

a first plunger means located in the first passage contacting the actuating means for moving the first plunger along the first passage in response to movement of the shift control means;

a second plunger located in the second passage contacting the first plunger for movement along the second passage in response to movement of the shift control means; and means biasing the first and second plungers into contact and biasing the first plunger and actuating means into contact.

6. The device of claim 4 wherein the forcing means comprises conical surfaces located at each end of the first plunger, a conical surface formed on the second plunger and contacting a conical surface of the first plunger, and a conical surface formed on the sleeve contacting a conical surface of the first plunger.

7. The device of claim 5 wherein the forcing means comprises conical surfaces located at each end of the first plunger, a conical surface formed on the second plunger and contacting a conical surface of the first plunger, and a conical surface formed on the sleeve contacting a conical surface of the first plunger.

* * * * *